US 8,898,694 B2

(12) United States Patent
Shimy et al.

(10) Patent No.: US 8,898,694 B2
(45) Date of Patent: Nov. 25, 2014

(54) SYSTEMS AND METHODS FOR INDICATING MEDIA ASSET ACCESS CONFLICTS USING A TIME BAR

(75) Inventors: Camron Shimy, Canyon Country, CA (US); Bryan Mitchell Drummond, Tulsa, OK (US); Paul Stathacopoulos, San Carlos, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/457,763

(22) Filed: Apr. 27, 2012

(65) Prior Publication Data

US 2013/0291007 A1    Oct. 31, 2013

(51) Int. Cl.
*H04N 7/10* (2006.01)
*G06F 3/00* (2006.01)

(52) U.S. Cl.
USPC .................... 725/32; 725/39; 725/40; 725/44; 725/52; 725/58

(58) Field of Classification Search
CPC .......................... H04N 21/4583; H04N 21/482
USPC ..................... 725/39–40, 44, 52, 58
See application file for complete search history.

(56) References Cited

U.S. PATENT DOCUMENTS

| | | | |
|---|---|---|---|
| 2003/0154484 A1 | 8/2003 | Plourde et al. | |
| 2003/0198462 A1 | 10/2003 | Bumgardner et al. | |
| 2004/0218905 A1* | 11/2004 | Green et al. | 386/83 |
| 2006/0268099 A1 | 11/2006 | Potrebic et al. | |
| 2008/0040752 A1* | 2/2008 | Kawana | 725/58 |
| 2012/0060188 A1* | 3/2012 | Stallings et al. | 725/44 |
| 2012/0167141 A1* | 6/2012 | Arora | 725/40 |

OTHER PUBLICATIONS

International Search Report and Written Opinion dated Jul. 23, 2013, International Application No. PCT/US2013/036708.

* cited by examiner

*Primary Examiner* — Gigi L Dubasky
(74) *Attorney, Agent, or Firm* — Ropes & Gray LLP

(57) ABSTRACT

Systems and methods for indicating media asset access conflicts using a time bar in accordance with various embodiments of the present invention are provided. A media guide display that includes at least some media asset listings and a time bar is generated. A first portion of the time bar representing a first time interval during which media assets, for which a respective media guidance function has been assigned, are scheduled for transmission is identified. A second portion, within the first portion of the time bar, which represents a second time interval during which the scheduled transmission times of the media assets overlap is identified. A first indicator is generated, for display in the first portion, to represent the first time interval. A second indicator is generated, for display in the second portion, to represent the second time interval during which the scheduled transmission times of the media assets overlap.

20 Claims, 7 Drawing Sheets

SYSTEMS AND METHODS FOR INDICATING MEDIA ASSET ACCESS CONFLICTS USING A TIME BAR

BACKGROUND

Traditional media guidance applications allow a user to schedule recordings or reminders for programs. These systems display program schedule information in a time and source guide format for a certain time period (e.g., 9-11 PM) in a given day. These traditional systems include indicators with a program listing that is in the display identifying whether a corresponding program has a scheduled recording or reminder. However, these traditional systems fail to indicate whether a program, corresponding to a program listing that falls outside of the displayed time period or corresponding to a source not being displayed, has a scheduled recording or reminder or conflicts with another scheduled recording or reminder (e.g., because of a shortage of tuners or storage devices). Moreover, these systems fail to indicate when the scheduled recording/reminder or conflict exists unless the user manually navigates to the program listing that corresponds to the program with the scheduled recording/reminder or conflict.

SUMMARY OF THE INVENTION

In view of the foregoing, systems and methods for indicating media asset access conflicts using a time bar in accordance with various embodiments of the present invention are provided.

In some embodiments, a media guide display is generated that includes a plurality of media asset listings and a time bar. The time bar may represent time intervals during which media assets are scheduled for transmission. In some implementations, the time intervals in the time bar may represent a 12-hour or 24-hour period (e.g., a half or full day) or any period of time greater than the period of time represented in a displayed media guide screen.

In some implementations, a first portion of the time bar that represents a first time interval during which media assets, for which a respective media guidance function has been assigned, are scheduled for transmission is identified. The media guidance application function may include a scheduled recording, a scheduled reminder, a recommendation, or any other type of media function or combination thereof. The media assets may correspond to a portion of the media asset listings in the generated media guide display. In some implementations, a first indicator is generated, for display in the first portion, to represent the first time interval during which the media assets, to which the media guidance function has been assigned, are scheduled for transmission. In some implementations, the first indicator may be a bar highlighting in a certain color those time intervals represented in the time bar that correspond to the first portion.

In some implementations, a second portion, within the first portion of the time bar, that represents a second time interval during which the scheduled transmission times of the media assets overlap is identified. In particular, the scheduled transmission times of the media assets for which the media guidance application function has been assigned may be analyzed. The scheduled transmission times that have a period that overlaps may be determined and the portion of the time bar that represents that time interval may be identified. In some implementations, a second indicator is generated, for display in the second portion, to represent the second time interval during which the scheduled transmission times of the media assets overlap. In some implementations, the second indicator may be a bar highlighting in a certain color, different from the first indicator, those time intervals represented in the time bar that correspond to the second portion.

In some embodiments, the display of the second indicator may be conditioned on a determination of whether there are sufficient resources available to perform the assigned media guidance application function during the period of overlap. In some implementations, two or more media assets may be scheduled for recording during the period of overlap. Accordingly, the second indicator may only be displayed in the portion of the time bar corresponding to that period of overlap if there are insufficient numbers of tuners/receivers or storage devices to record each of the two or more media assets.

In some embodiments, the media guide display may include the time bar that includes the first and second indicators simultaneously displayed with the plurality of media asset listings. In some implementations, the time intervals in the time bar that are indicated based on the scheduled transmission times of the media assets to which media guidance functions have been assigned may be different from the time interval represented in the media guide display for the displayed media asset listings. In particular, the time bar may represent times during which media guidance application functions have been assigned regardless of whether the media assets to which the functions have been assigned are currently being shown in the media guide display.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
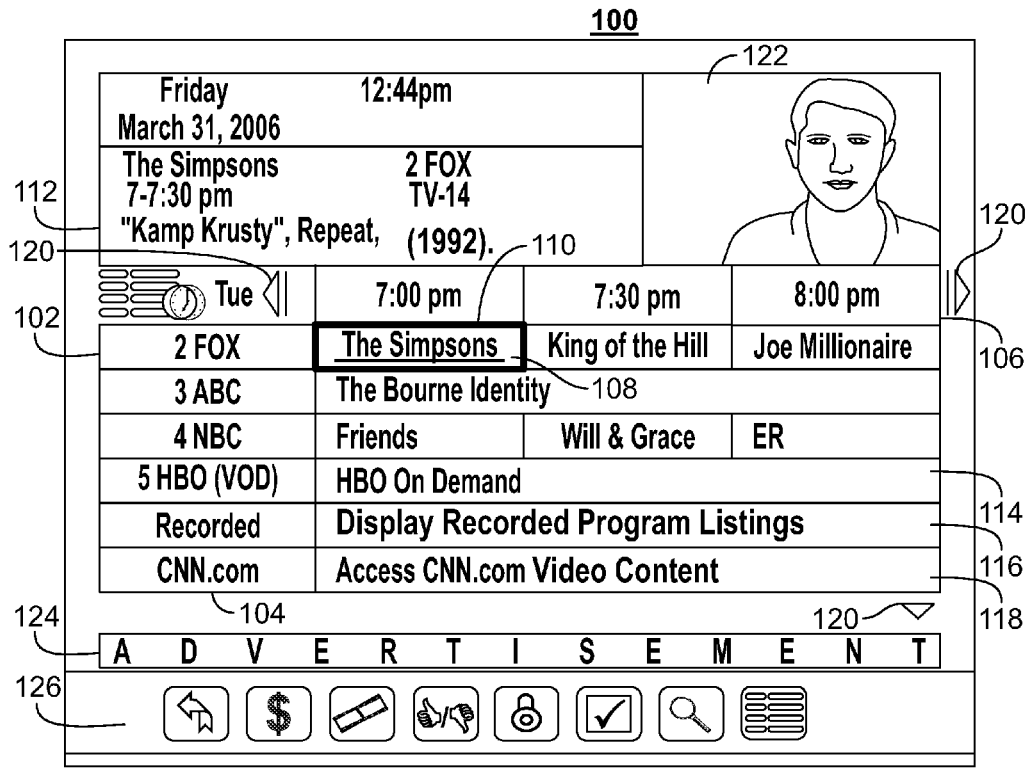
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
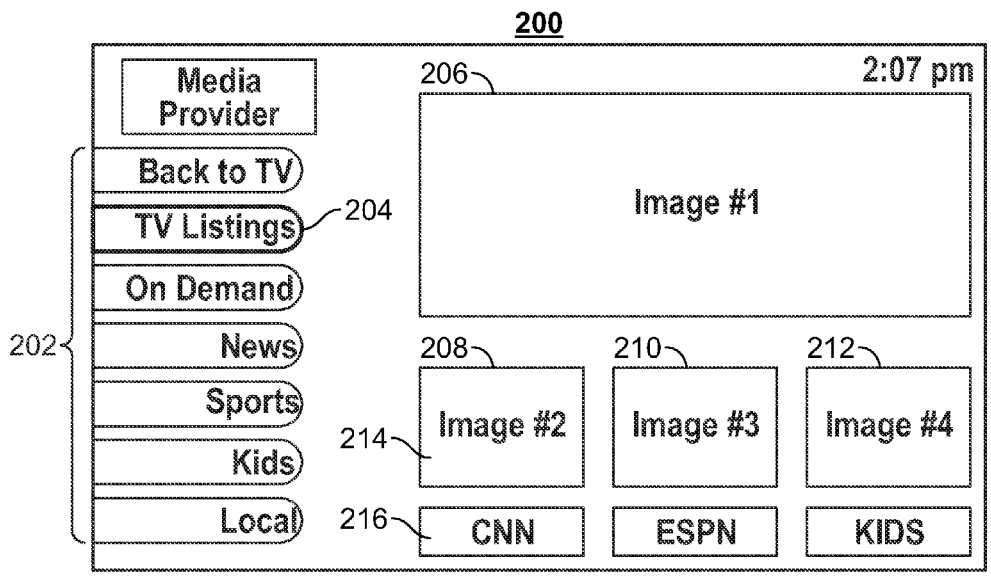

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with:

(1) a column of channel/content source type identifiers 104, where each channel/content source type identifier (which is a cell in the column) identifies a different channel or content source type available; and (2) a row of time identifiers 106, where each time identifier (which is a cell in the row) identifies a time block of programming (e.g., a scheduled transmission time of the corresponding content provided by the content source). Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information. Content source type may include any satellite, cable, broadcast, Internet, on-demand or other suitable source of content.

As discussed in more detail in connection with FIGS. 5-7, grid 102 may include a time bar. The time bar may represent time intervals during which media assets are scheduled for transmission. A first portion of the time intervals that corresponds to time intervals during which media assets, that have been assigned a media guidance application function, are scheduled for transmission may be visually indicated with a first indicator (e.g., a bar or region overlaying the time interval with a first color). A second portion, within the first portion of the time bar, which represents a time interval during which the scheduled transmission times of the media assets overlap may be visually indicated with a second indicator (e.g., a bar or region overlaying the time interval with a second color). The media assets for which the time bar portions are indicated may correspond to media assets within the displayed portion of grid 102 and not within the displayed portion of grid 102 (e.g., may correspond to a time interval outside the time interval being displayed or may be transmitted by content sources not in the displayed portion of grid 102).

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. These features may be media guidance application functions. Setting a given media guidance application function for a given program listing may assign the media guidance application function to a media asset associated with the program listing (e.g., schedule the media asset for recording or schedule a reminder for the media asset). The media guidance application function may also automatically be assigned to a particular media asset (e.g., as a recommendation). Specifically, when the media guidance application function is a recommendation function that is assigned to a media asset, the media guidance application may include an indicator or promote or specifically identify a particular program listing corresponding to the media asset to the user. The media guidance function that is a recommendation may be assigned automatically to media assets that match characteristics specified in a profile associated with the user. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Specifically, content or media assets that match the user profile may be assigned a media guidance application function (e.g., a recommendation) automatically and be identified to the user. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
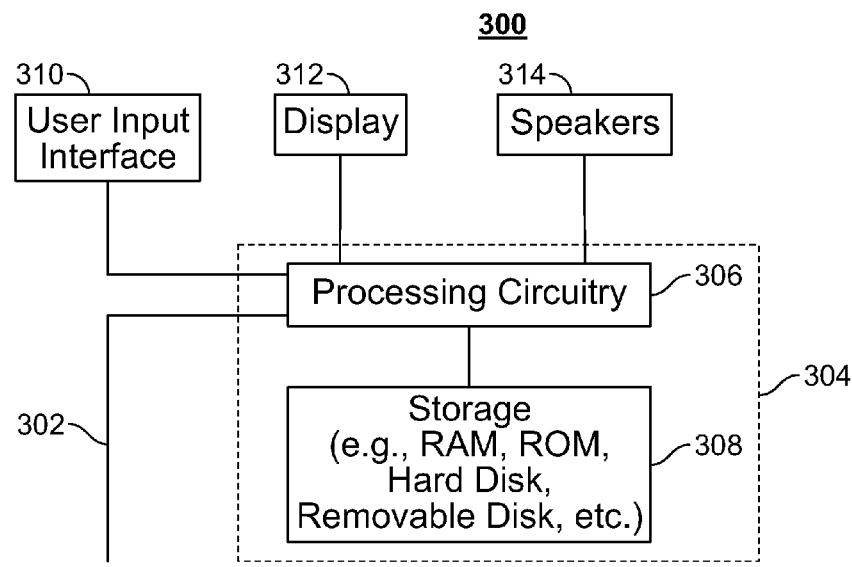
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308. Storage 308 may maintain a list of all media assets for which a media guidance application function has been assigned. For example, storage 308 may maintain a list of media assets that have been scheduled for recording. Storage 308 may maintain a list of media assets for which a reminder has been scheduled. Storage 308 may maintain a list of media assets that have been identified for recommendation to a user.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
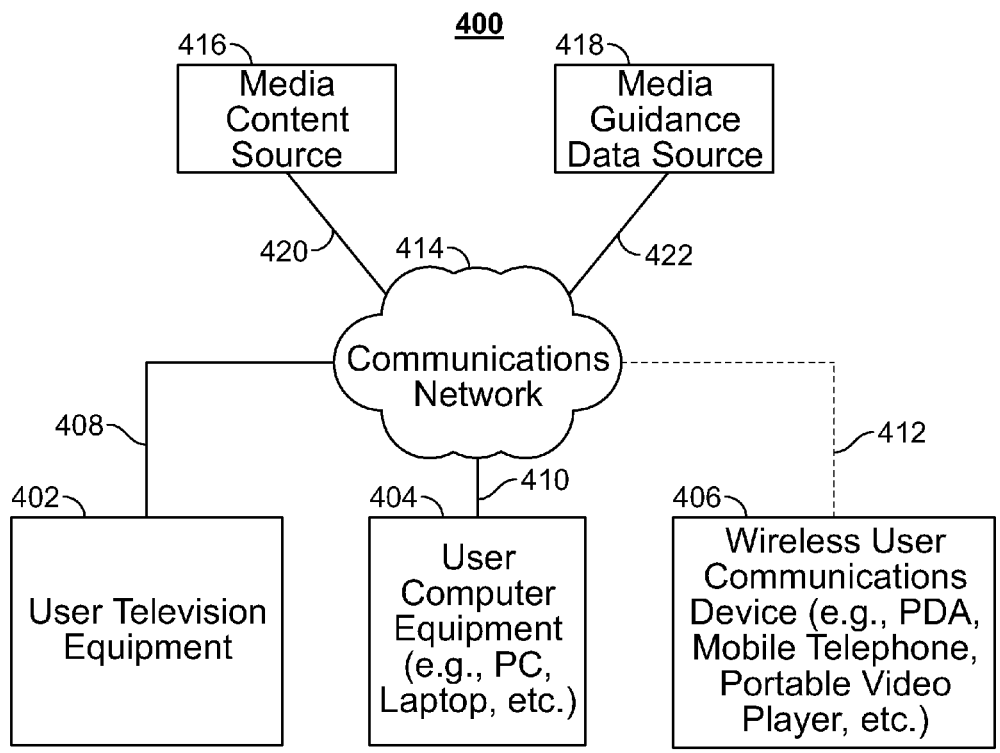
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device or assigning media guidance application functions to media assets. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings and media guidance application functions include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry 304 may identify media assets for which a media guidance application has been assigned. For example, control circuitry 304 may retrieve from storage device 308 a list of media assets for which a media guidance application function has been assigned. Control circuitry 304 may determine the scheduled transmission times (e.g., a broadcast time or time when the media asset will be made available) of those media assets and identify a time interval in a time bar that represents the scheduled transmission time. Control circuitry 304 may determine whether any of the scheduled transmission times of the media assets overlap (e.g., whether two or more media assets are scheduled for transmission at the same time). Control circuitry 304 may visually indicate portions of the time bar that represent the time intervals of the scheduled transmission times of the media assets and separately visually indicate those portions of the time bar that represent the time intervals during which the scheduled transmission times overlap. In some implementations, the time bar may be displayed together with a media guide (e.g., a guide that represents scheduled transmission times of media assets, such as a television program guide).

Figure 5:
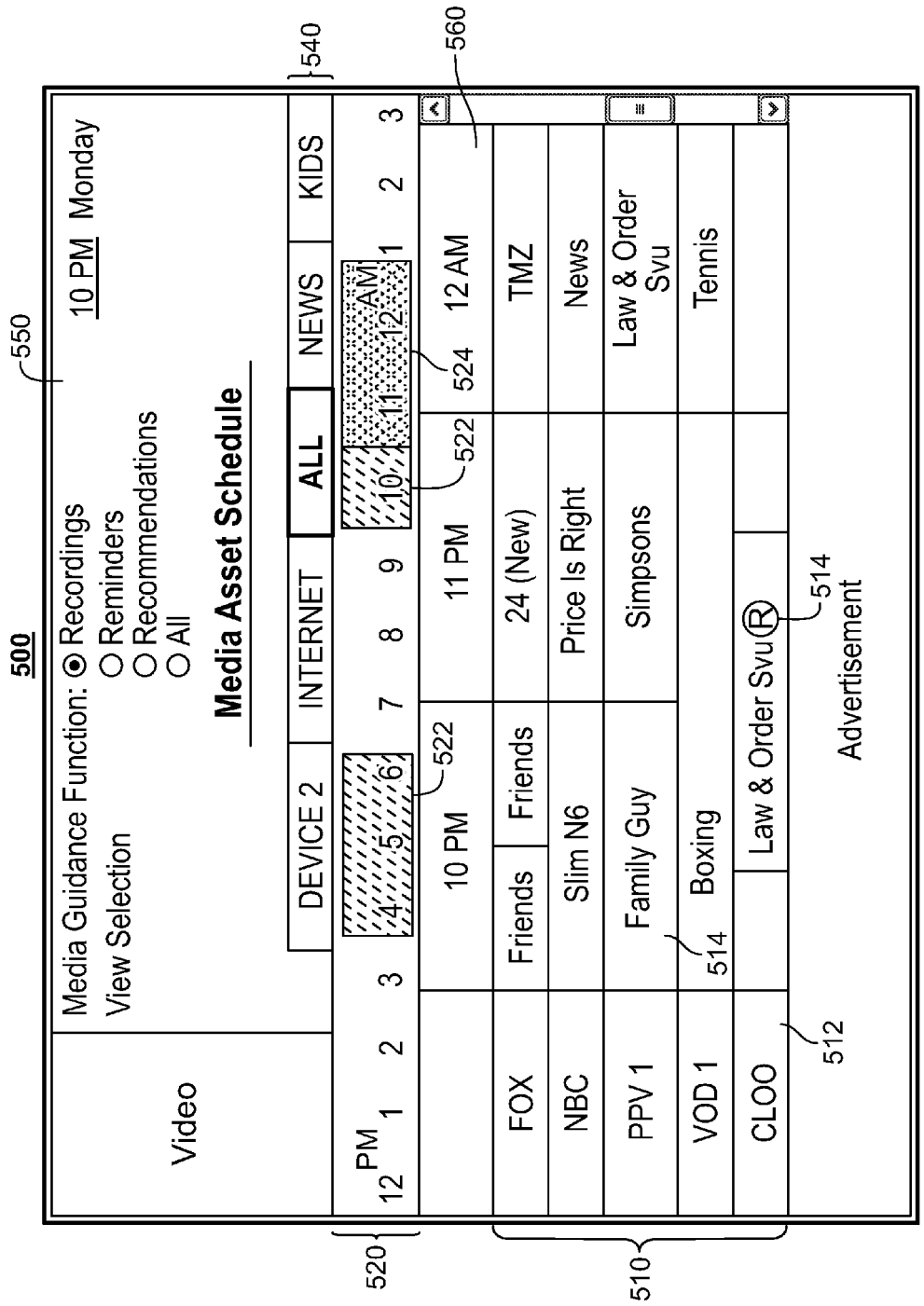
FIG. 5 is an illustrative display screen of media asset access conflict identification and first type of media guidance function assignment in accordance with another embodiment of the invention.

FIG. 5 is an illustrative display screen 500 of media asset access conflict identification and first type of media guidance function assignment in accordance with another embodiment of the invention. Screen 500 may include a media guidance function view selection region 550, a media asset schedule region 510, a time bar 520 and a media asset category selection region 540. Screen 500 may include similar information and displays as grid 102 (FIG. 1).

Media asset schedule region 510 may include a plurality of media asset listings 514 and content sources that transmit the media assets corresponding to the media asset listings 514. The content sources included in region 510 may include linear and non-linear content sources and media assets. For example, region 510 may include on-demand content sources, pay-per-view content sources, Internet content sources (e.g., HULU and AMAZON) and broadcast content sources (e.g., television channels). Region 510 may display media assets transmitted by the respective content sources during a corresponding time interval 560 that is displayed.

In some implementations, control circuitry 304 may generate time interval 560 in screen 500 that represents a time interval spanning 10 PM through 1 AM. For each displayed time interval in time interval 560, a media asset listing corresponding to a media asset scheduled for transmission during the displayed time interval is displayed for each content source being displayed. In some implementations, control circuitry 304 may only display a limited number of media asset listings. Specifically, control circuitry 304 may only display a number of media asset listings that can fit in the display for the displayed time interval 560 and content sources. Control circuitry 304 may scroll or change the display to retrieve and display other media asset listings in response to receiving a user input requesting media asset listings for an earlier or later time period (e.g., using a scroll bar). Similarly, control circuitry 304 may display scroll or change the display to retrieve and display other media asset listings in response to receiving a user input requesting media asset listings for a different set of content sources (e.g., using a scroll bar).

In some embodiments, control circuitry 304 may determine from the displayed media asset listings, which media asset listings correspond to media assets for which a media guidance application function has been assigned. For example, the media guidance application function assigned to a media asset may be a scheduled recording. Specifically, control circuitry 304 may determine that a media asset (e.g., "Law & Order SVU") has been scheduled for recording. In addition, control circuitry 304 may determine that a media asset listing for the "Law & Order SVU" media asset is being displayed. In response, control circuitry 304 may generate an indicator 514 for display with the media asset listing to identify to the user the scheduled media guidance application function assigned to the corresponding media asset.

The media guidance application may display time bar 520 that represents a plurality of time intervals. In some implementations, the time intervals in time bar 520 may represent a 12-hour or 24-hour period (e.g., a half or full day). This may allow a user to see in a given day all of the time intervals during which media guidance application functions have been assigned or during which overlaps occur. The time intervals represented by time bar 520 may be greater than time interval 560. For example, time interval 560 may represent a period of time ranging from 10 PM through 1 AM (e.g., 3 hour time period) while time bar 520 represents time intervals for a 16 hour time period.

In some embodiments, control circuitry 304 may determine which media assets have been assigned a media guidance application function. Specifically, control circuitry 304 may receive a user selection of one of the media guidance application functions listed in region 550 (e.g., recordings). In response, control circuitry 304 may determine a current day or time interval represented by time bar 520 and identify all media assets scheduled for recording (or for which the selected media guidance application function has been assigned) during one of the time intervals in the represented time interval (e.g., the 16-hour time period). For example, control circuitry 304 may retrieve the list of all scheduled recordings for media assets and filter the list based on the time interval represented by time bar 520 (e.g., filter the list based on a 16-hour time period measured from 12 PM of the current day). Specifically, control circuitry 304 may be instructed by the media guidance application to retrieve the list of all scheduled recordings and may operate under the control of the media guidance application.

In some implementations, the retrieved list of all scheduled recordings may include four media assets (e.g., "Friends" which is scheduled for transmission between 7 PM-8 PM on Tuesday, "Batman" which is scheduled for transmission between 9-10 PM on Monday, "Simpsons" which is scheduled for transmission between 9:30 PM-10 PM on Monday, and "Family Guy" which is scheduled for transmission between 10-10:30 PM on Monday) and the time interval represented by time bar 520 may be a 16-hour time period measured from 12 PM of the current day, Monday. Accordingly, control circuitry 304 may only consider (e.g., may filter the list) three of the four media asset that are scheduled for transmission on Monday during the represented time interval of time bar 520 (e.g., "Batman" which is scheduled for transmission between 9-10 PM on Monday, "Simpsons" which is scheduled for transmission between 9:30 PM-10 PM on Monday, and "Family Guy" which is scheduled for transmission between 10-10:30 PM on Monday). Specifically, control circuitry 304 may analyze the scheduled transmission times of the media assets in the list and select only those that fall within the time interval represented by time bar 520. This determination may be performed independent of time interval 560 or the media asset listings being displayed in region 510. Specifically, control circuitry 304 may determine whether media assets have been scheduled for recording regardless of whether corresponding media asset listings are presently displayed in region 510.

Control circuitry 304 may identify a first portion of time bar 520 that represents time intervals of scheduled transmission times of the media assets in the filtered list. Specifically, control circuitry 304 may determine which time intervals in time bar 520 represent transmission times of the media assets for which the media guidance application function has been assigned (e.g., the transmission times of the media assets selected for recording). Control circuitry 304 may generate a first indicator 522 for display within the determined first portion of time bar 520 to represent those time intervals during which media assets are scheduled for transmission that have been assigned a media guidance application function. First indicator 522 may be a graphical icon (e.g., a bar that highlights the first portion of time bar 520 in a certain color, such as the color red).

Control circuitry 304 may analyze the scheduled transmission times of the media assets in the filtered lists (e.g., those media assets scheduled for transmission during the time interval represented by time bar 520) to detect overlaps. For example, control circuitry 304 may determine whether any of the scheduled transmission times are identical or have a period of time during which two or more of the media assets are scheduled for transmission simultaneously. In particular, control circuitry 304 may determine that three media assets are included in the filtered list (e.g., "Batman" which is scheduled for transmission between 9-10 PM, "Simpsons" which is scheduled for transmission between 9:30 PM-10 PM, and "Family Guy" which is scheduled for transmission between 10-10:30 PM). In such circumstances, control circuitry 304 may determine that only the scheduled transmission times of first media asset "Batman" and second media asset "Simpsons" overlap during the 9:30 PM-10 PM time interval but none overlaps with the third media asset "Family Guy."

Control circuitry 304 may identify a second portion of time bar 520, within the first portion of time bar 520, that represents time intervals of those scheduled transmission times, of the media assets in the filtered list, that overlap. Specifically, control circuitry 304 may determine which time intervals in time bar 520 represent scheduled transmission times of the media assets for which the media guidance application function has been assigned (e.g., the transmission times of the media assets selected for recording) and within those, control circuitry 304 may determine which scheduled transmission times overlap. Control circuitry 304 may generate a second indicator 524 for display within the determined second portion of time bar 520 to represent those time intervals during which media assets that have been assigned a media guidance application function which have overlaps in their scheduled transmission times. Second indicator 524 may be a graphical icon (e.g., a bar that highlights the second portion of time bar 520 in a certain color, such as the color blue or dark red). Second indicator 524 may be different from first indicator 522 to enable a user to visually distinguish the different portions of time bar 520.

Visually distinguishing various portions of time bar 520 enables a user to see simultaneously all time intervals during which media guidance application functions are assigned to media assets and also overlaps in scheduled transmission times of those media assets for which the media guidance application function has been assigned. This gives the user the ability to see the time intervals in a given day or time frame during which these media functions are assigned and overlaps in transmission times without having to specifically navigate to a given media asset listing in region 510. In particular, even though a media asset for which a media guidance application function has been assigned is not currently being displayed in region 510, an indicator in time bar 520 informs the user that there exists a time interval (e.g., the time interval corresponding to the scheduled transmission time of the media asset), which may or may not be displayed, during which a media guidance application function has been assigned. In addition, because time bar 520 may include a larger range of time intervals than those in time interval 560, the user is informed about media guidance application function assignments to media assets for past and/or future time intervals without specifically navigating to those past and/or future time intervals.

In some embodiments, control circuitry 304 may condition generation and display of second indicator 524 on whether or not the overlaps in scheduled transmission times of the media assets for which the media guidance application function has been assigned cause resource conflicts (e.g., because of insufficient resources). For example, after control circuitry 304 identifies the overlaps in the scheduled transmission times of the media assets, control circuitry 304 may determine the type of media guidance application function that is assigned to each of the media assets that have the scheduled transmission times that overlap. Specifically, when a first media asset has a scheduled transmission time that overlaps with a second media asset, control circuitry 304 may determine whether the media guidance application function assigned to each of those media assets is a scheduled recording, reminder, recommendation, etc. After determining the type of function assigned to each of those media assets, control circuitry 304 may determine what type of resource is needed to execute the assigned media guidance application function (e.g., a storage device, a tuner, a display, etc.).

In some implementations, control circuitry 304 may determine whether there is a sufficient number of the types of resources needed to execute the assigned media guidance application function. For example, the first and second media assets may both be scheduled for recording and therefore both may require a receiver/tuner and a storage device to execute their assigned media guidance application function (recording). Accordingly, control circuitry 304 may determine whether there are at least two storage devices and at least two tuners or receivers available during the time interval corresponding to the overlap in their scheduled transmission times. Similarly, the first and second media assets may both be scheduled for reminders and therefore both may require a receiver/tuner and display device to execute their assigned media guidance application function (recording). Accordingly, control circuitry 304 may determine whether there are at least two tuners or receivers and display devices available during the time interval corresponding to the overlap in their scheduled transmission times.

In response to determining that there are sufficient resources available to execute the media guidance application function during the time interval corresponding to the overlap in scheduled transmission times of the media assets, control circuitry 304 may prevent or not display second indicator 524 in the second portion of time bar 520. Instead, control circuitry 304 may display first indicator 522 in that second portion to indicate that there exists media assets scheduled for transmission in that time interval portion of time bar 520 that are assigned a media guidance application function even though both media assets require the same resources to have the function executed. In response to determining that there are insufficient resources available to execute the media guidance application function during the time interval corresponding to the overlap in scheduled transmission times of the media assets, control circuitry 304 may display second indicator 524 in the second portion of time bar 520, as discussed above and below.

Media asset category selection region 540 may list a plurality of categories that may be selected to modify which media asset listings are included in region 510. In particular, control circuitry 304 may receive a user selection of one of the categories displayed in region 540 that represents a given content source(s) (e.g., Internet). In response, control circuitry 304 may retrieve media asset listings that correspond to media assets that are only transmitted from the content source(s) in the selected category (e.g., the Internet). Control circuitry 304 may update the indicators provided in time bar 520 to represent time intervals during which media assets for which media guidance functions have been assigned are scheduled for transmission and overlaps in those scheduled transmission times.

In some embodiments, control circuitry 304 may receive a user selection of one of the categories displayed in region 540 that represents a second screen device (e.g., Device2). In such circumstances, the media asset listings in region 510 may not be updated (e.g., because both devices are configured to receive content at the same times). However, control circuitry 304 may update the indicators provided in time bar 520 to represent time intervals during which media assets for which media guidance functions have been assigned for execution with the second screen device are scheduled for transmission and overlaps in those scheduled transmission times. For example, control circuitry 304 may retrieve from a memory of the second screen device a list of media assets for which a media guidance application function has been assigned using the second screen device or for execution on the second screen device. Control circuitry 304 may analyze those media assets to identify their corresponding scheduled transmission times and identify any overlaps in scheduled transmission times. Control circuitry 304 may update time bar 520 to represent those scheduled transmission times and overlaps for those media assets for which the media guidance application function has been assigned.

In some embodiments, control circuitry 304 may receive a user selection of one of the categories displayed in region 540 that represents a given content category (e.g., News). In response, control circuitry 304 may retrieve media asset listings that correspond to media assets that have content characteristics of the selected category (e.g., the News media assets). Control circuitry 304 may update the indicators provided in time bar 520 to represent time intervals during which media assets for which media guidance functions have been assigned are scheduled for transmission and overlaps in those scheduled transmission times.

In some embodiments, the overlaps in scheduled transmission times indicated in time bar 520 by second indicator 524 may only be visually indicated when control circuitry 304 determines that the are insufficient resources available to or in user equipment device 300 to execute the media guidance application functions assigned to those media assets. In some embodiments, control circuitry 304 may display second indicator 524 regardless of whether there are sufficient resources available to or in user equipment device 300 to execute the media guidance application functions assigned to those media assets.

Control circuitry 304 may receive a user selection of another one of the media guidance application functions listed in region 550 (e.g., recommendations). In response, control circuitry 304 may generate and navigate the user to display screen 600. Control circuitry 304 may determine a current day or time interval represented by time bar 520 and identify all media assets that are recommended to the user and which are scheduled for transmission during one of the time intervals in the represented time interval (e.g., the 16-hour time period). For example, control circuitry 304 may retrieve the list of all media asset recommendations and filter the list based on the time interval represented by time bar 520 (e.g., filter the list based on a 16-hour time period measured from 12 PM of the current day).

Figure 6:
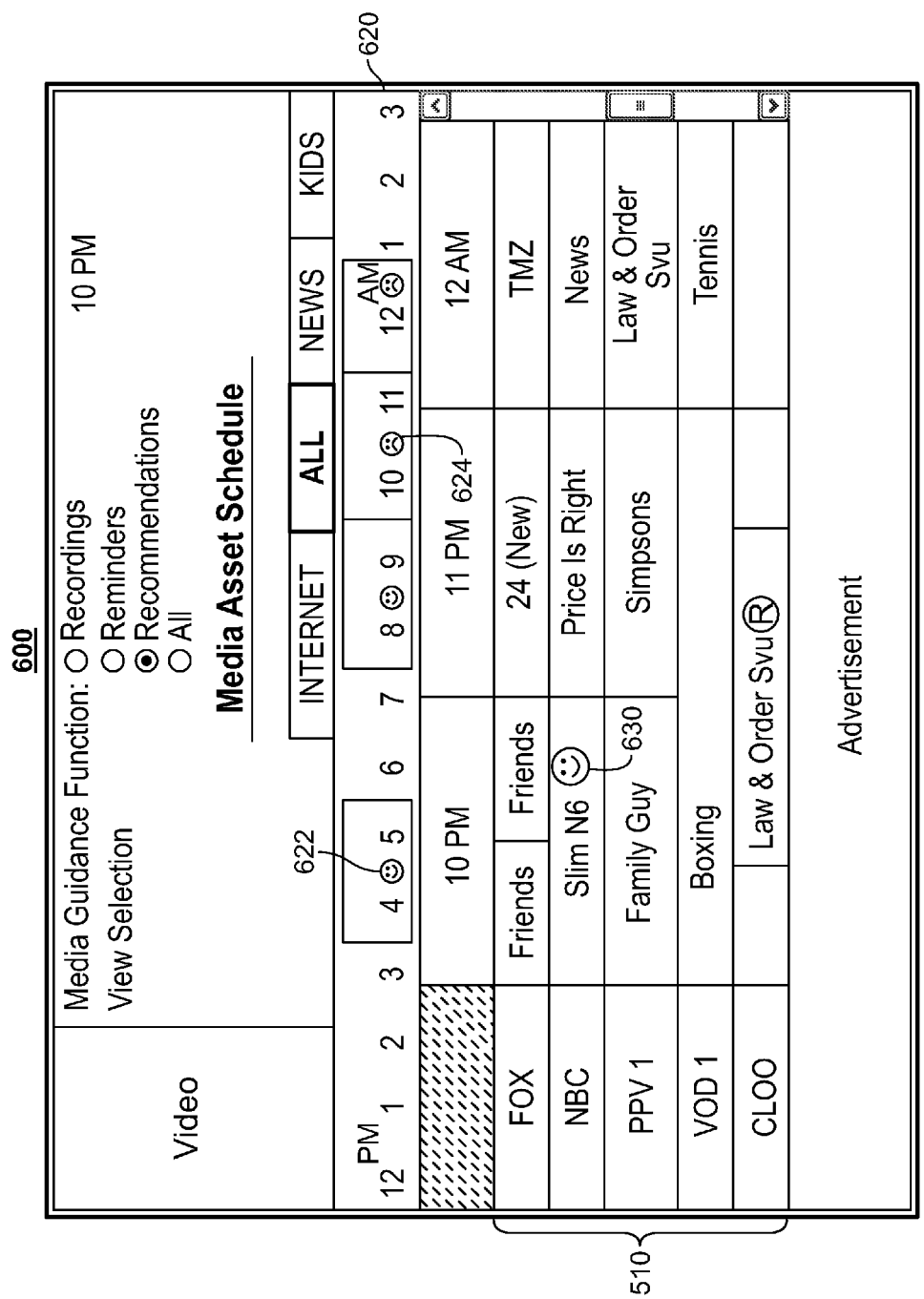
FIG. 6 is an illustrative display screen of media asset access conflict identification and second type of media guidance function assignment in accordance with another embodiment of the invention.

FIG. 6 is an illustrative display screen 600 of media asset access conflict identification and second type of media guidance function assignment in accordance with another embodiment of the invention. Screen 600 includes the same components and regions as screen 500 except the indicators in region 510 and time bar 520 correspond to recommended media assets.

In some embodiments, control circuitry 304 may determine from the displayed media asset listings in screen 600, which media asset listings correspond to media assets for which a media guidance application function has been assigned. For example, the media guidance application function assigned to a media asset may be a recommendation (e.g., an automatically assigned reminder based on a user profile). Specifically, control circuitry 304 may determine that a media asset (e.g., "Slim N6") matches a user profile and is recommended for viewing by the user. In addition, control circuitry 304 may determine that a media asset listing for the "Slim N6" media asset is being displayed. In response, control circuitry 304 may generate an indicator 630 for display with the media asset listing to identify to the user the scheduled media guidance application function (e.g., recommendation) assigned to the corresponding media asset. Indicator 630 may have a unique shape that informs the user that the indication is a recommendation rather than a reminder or recording (FIG. 5).

Control circuitry 304 may determine a current day or time interval represented by time bar 520 and identify all media assets recommended to the user during one of the time intervals in the represented time interval (e.g., the 16-hour time period) of the time bar 620 in screen 600. For example, control circuitry 304 may retrieve the list of all recommended media assets and filter the list based on the time interval represented by time bar 620 (e.g., filter the list based on a 16-hour time period measured from 12 PM of the current day).

In some implementations, the retrieved list of all recommended media assets may include four media assets (e.g., Seinfeld which is scheduled for transmission between 7 PM-8 PM on Tuesday, Big Bang Theory which is scheduled for transmission between 4-5 PM on Monday, Slim N6 which is scheduled for transmission between 8 PM-12 AM on Monday, and Family Guy which is scheduled for transmission between 10-11 PM on Monday) and the time interval represented by time bar 620 may be a 16-hour time period measured from 12 PM of the current day, Monday. Accordingly, control circuitry 304 may only consider (e.g., may filter the list for) three of the four media assets that are scheduled for transmission on Monday during the represented time interval of time bar 620 (e.g., Big Bang Theory which is scheduled for transmission between 4-5 PM on Monday, Slim N6 which is scheduled for transmission between 8 PM-12 AM on Monday, and Family Guy which is scheduled for transmission between 10-11 PM on Monday). Specifically, control circuitry 304 may analyze the scheduled transmission times of the media assets in the list and select only those that fall within the time interval represented by time bar 620. Specifically, control circuitry 304 may determine whether media assets are recommended regardless of whether corresponding media asset listings are presently displayed in region 510.

Control circuitry 304 may identify a first portion of time bar 620 that represents time intervals of scheduled transmission times of the media assets in the filtered list of recommendations. Specifically, control circuitry 304 may determine which time intervals in time bar 620 represent transmission times of the media assets for which the media guidance application function has been assigned (e.g., the transmission times of the media assets that are recommended). Control circuitry 304 may generate a first indicator 622 for display within the determined first portion of time bar 620 to represent those time intervals during which media assets are scheduled for transmission that have been assigned a media guidance application function. First indicator 622 may be a graphical icon (e.g., a bar that highlights the first portion of time bar 620 in a certain color, such as blue, and/or include a happy face).

Control circuitry 304 may analyze the scheduled transmission times of the media assets in the filtered lists (e.g., those media assets scheduled for transmission during the time interval represented by time bar 620) to detect overlaps. For example, control circuitry 304 may determine whether any of the scheduled transmission times are identical or have a period of time during which two or more of the media assets are scheduled for transmission simultaneously. In particular, control circuitry 304 may determine that three media assets are included in the filtered list. In such circumstances, control circuitry 304 may determine that only the scheduled transmission times of the first media asset and the second media asset overlap during the 10 PM-11 PM time interval but none overlaps with the third media asset.

Control circuitry 304 may identify a second portion of time bar 620, within the first portion of time bar 620, that represents time intervals of those scheduled transmission times, of the media assets in the filtered list of recommended media assets, that overlap. Specifically, control circuitry 304 may determine which time intervals in time bar 620 represent scheduled transmission times of the media assets for which the media guidance application function has been assigned (e.g., the transmission times of the media assets that are recommended) and within those, control circuitry 304 may determine which scheduled transmission times overlap. Control circuitry 304 may generate a second indicator 624 for display within the determined second portion of time bar 620 to represent those time intervals during which media assets that are recommended have overlaps in their scheduled transmission times. Second indicator 624 may be a graphical icon (e.g., a bar that highlights the second portion of time bar 620 in a certain color, such as the color purple, and/or a sad face). Second indicator 624 may be different from first indicator 622 to enable a user to visually distinguish the different portions of time bar 620.

In some embodiments, control circuitry 304 may condition generation and display of second indicator 624 on whether or not the overlaps in scheduled transmission times of the media assets for which the media guidance application function has been assigned cause resource conflicts (e.g., because of insufficient resources), as discussed above in connection with FIG. 5.

In some embodiments, control circuitry 304 may display indicators 522, 524, 622 and 624 simultaneously. This may be performed in response to receiving a user selection of "all" option in region 550. Each indicator 522, 524, 622 and 624 may have a different visual characteristic to enable a user to determine the type of media guidance application function being identified by the indicator. For example, each indicator may uniquely inform the user whether the indicator is identifying a recording, a reminder or a recommendation and whether the indicator is identifying an overlap in scheduled transmission times or just an assignment of a corresponding media guidance application function.

In some embodiments, time bar 520 may be interactive. Specifically, a user may select a region being highlighted or indicated in time bar 520 to view a list of media assets that caused that region to be highlighted. For example, the user may select a portion of time bar 520 being indicated by second indicator 524 to view a list of media assets that have overlaps (or conflicts) in their scheduled transmission times. By viewing the list of media assets that correspond to the given indicator, the user may resolve conflicts caused by the media assets by, for example, un-assigning the media guidance application function from one or both of the media assets that are causing conflicts. Alternatively, the user may change or re-assign the assigned media guidance application function for one of the media assets to be a different function.

Control circuitry 304 may receive a user selection of one of the indicators displayed in time bar 520. For example, control circuitry 304 may receive a user selection of second indicator 524. In response, control circuitry 304 may generate screen 700 which includes a window 710 (FIG. 7). Alternatively, in response, control circuitry 304 may navigate the user to a separate display which includes the contents and functionality of window 710 in full screen or partial screen mode.

Figure 7:
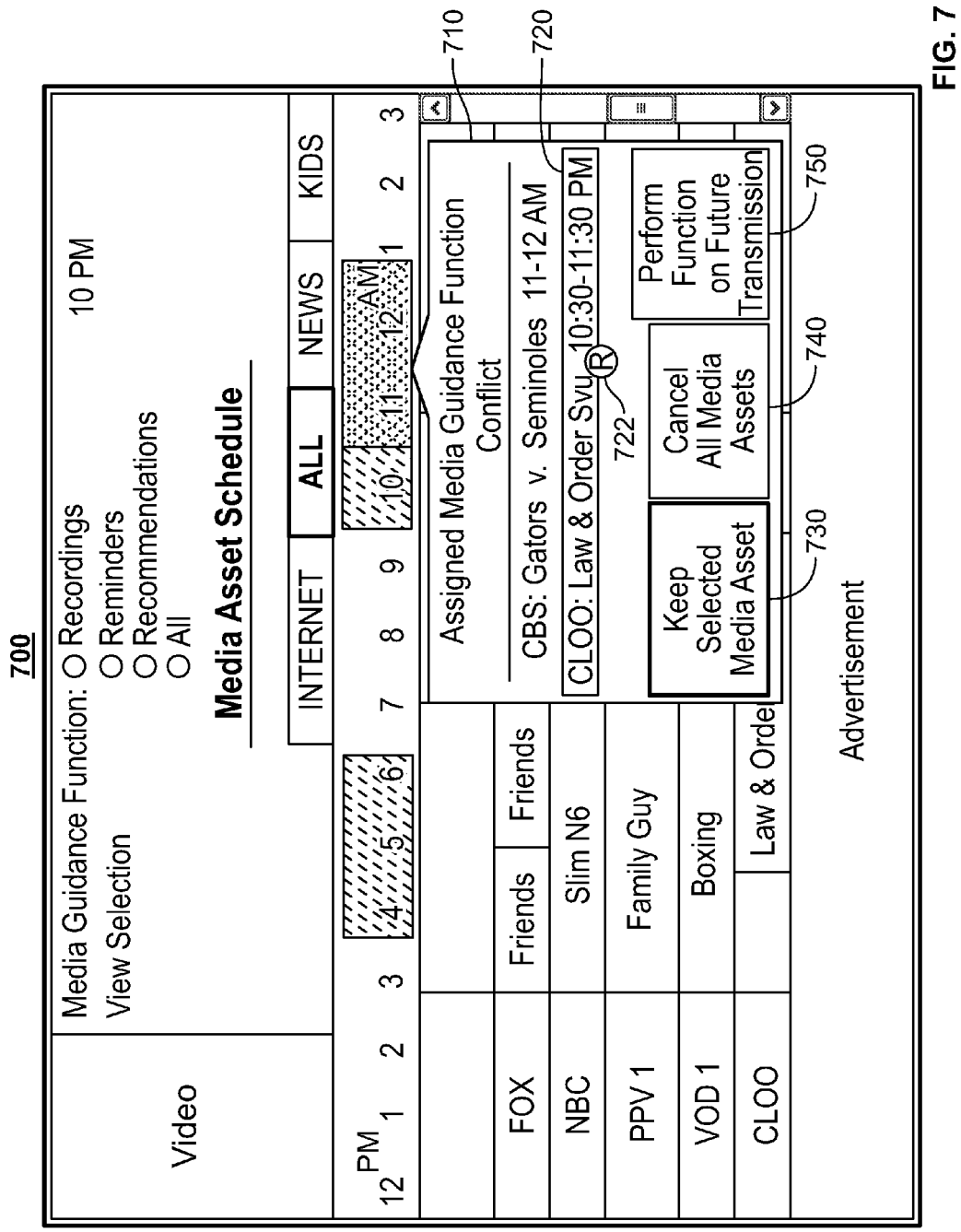
FIG. 7 is an illustrative display screen of media asset access conflict resolution in accordance with another embodiment of the invention.

FIG. 7 is an illustrative display screen 700 of media asset access conflict resolution in accordance with another embodiment of the invention. Screen 700 includes a conflict resolution window 710. The functionality discussed in connection with FIG. 7 is described in the context of receiving a user selection of second indicator 524 (FIG. 5). It should be understood that the same or similar teachings apply to FIG. 7 when taken in the context of receiving a user selection of second indicator 624 (FIG. 6) with a difference being that conflict resolution is performed based on recommended media assets instead of media assets scheduled for recording.

In some implementations, in response to receiving a user selection of second indicator 524, control circuitry 304 may retrieve from the filtered list of media assets the set of media assets that have scheduled transmission times which have been determined to overlap or include overlap intervals (or for which a resource conflict is identified). Control circuitry 304 may display representations of the set of media assets in window 710. For example, control circuitry 304 may generate and display a title of each media asset in the set of media assets, a channel or content source identifier, an image, clip or graphical representation of the media assets, a scheduled transmission time, overlap time interval, and/or any combination of the same.

In some implementations, control circuitry 304 may determine the media guidance application function assigned to the set of media assets. Control circuitry 304 may generate and display a visual indication of the type of media guidance application assigned to the set of media assets for which the overlap or conflict is determined. In some embodiments, the media assets, which have an overlap in their scheduled transmission times, may be assigned two or more different media guidance application functions that require access to a same resource. For example, a reminder may be scheduled for one media asset and another media asset may be scheduled for recording. Accordingly, because a tuner or receiver may be required for the reminder to be executed and for the recording to be performed during the period of overlap, control circuitry 304 may identify those media assets as being part of the set that cause a resource conflict. Control circuitry 304 may include an indication in window 710 of the types of media guidance applications functions assigned to each media asset (e.g., recording, reminder, and/or recommendation).

Window 710 may include a keep selected media asset option 730, a cancel all media assets option 740 and a perform function on future transmission option 750. Control circuitry 304 may receive a user selection of one or more of the display media assets 720. In response to receiving a user selection of option 730, control circuitry 304 may maintain the media guidance application function assigned to the selected media asset and un-assign or remove the media guidance application function from being assigned to another of the displayed media assets in window 710. For example, control circuitry 304 may keep the selected media asset as being scheduled for recording and un-schedule a recording or reminder assigned for another of the displayed media assets that the user did not select. Accordingly, the conflict is removed because the resources would not be required for the media guidance application function to be performed for both media assets during the overlap time interval.

In response to receiving a user selection of option 740, control circuitry 304 may un-assign the media guidance application function from all of the displayed media assets in window 710. For example, control circuitry 304 may un-schedule a recording or reminder assigned to all of the displayed media assets in window 710. In response to receiving a user selection of option 750, control circuitry 304 may determine whether there exists a future transmission of the same or similar media asset as the one selected by the user in window 710. When control circuitry 304 identifies a future transmission of a media asset corresponding to the selected media asset, control circuitry 304 may change the media guidance application assigned to the selected asset to be assigned to the future transmission of the selected asset. Accordingly, the conflict is removed because the resources would not be required for the media guidance application function to be performed for both media assets during the overlap time interval.

In some implementations, control circuitry 304 may determine whether any future transmissions of the media assets in window 710 exist prior to or during generation of window 710. For any media asset determined to have a future transmission, control circuitry 304 may generate and display indicator 722 with the media asset representation in window 710. Indicator 722 may inform the user that a future transmission is available for the corresponding media asset. In some implementations, if none of the media assets is determined to have a future transmission, control circuitry 304 may omit the display from window 710 of option 750 or may grey out (make unavailable) option 750 if it is displayed in window 710.

In some embodiments, control circuitry 304 may receive a user selection of another one of the indicators displayed in time bar 520. For example, control circuitry 304 may receive a user selection of first indicator 522. In response, control circuitry 304 may generate screen 700 which includes a window 710 (FIG. 7). Alternatively, in response, control circuitry 304 may navigate the user to a separate display which includes the contents and functionality of window 710 in full screen or partial screen mode.

In such circumstances, when control circuitry 304 receives a user selection of first indicator 522, window 710 may list representations of all media assets which have been assigned a media guidance application function and which are scheduled for transmission during the time interval of the portion identified by first indicator 522. The user may select between various media asset representations to modify assigned functions using, for example, options 730, 740 and 750.

Figure 8A:
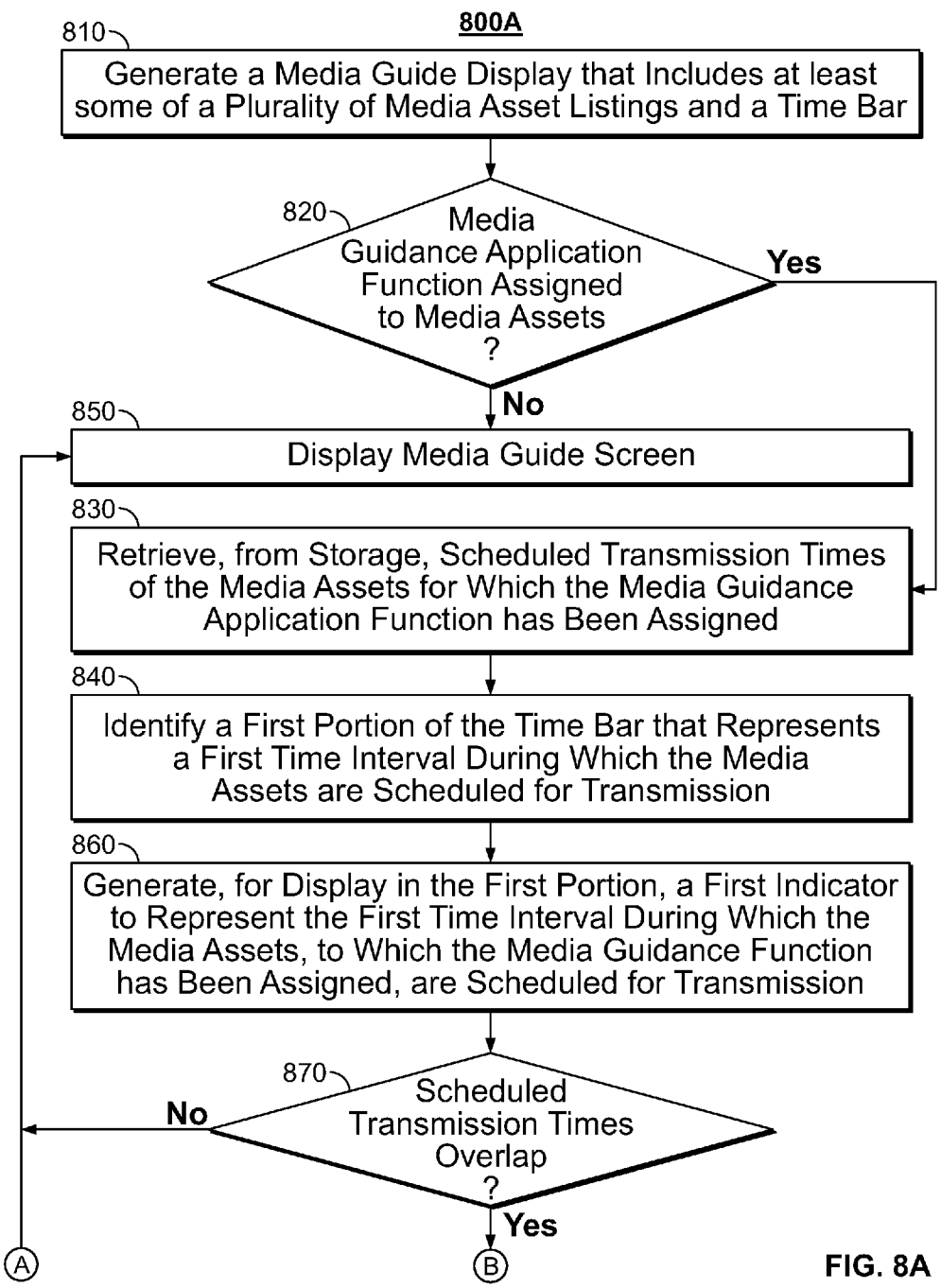
FIGS. 8A and 8B are diagrams of a process for indicating media asset access conflicts using a time bar in accordance with embodiments of the invention.
Figure 8B:
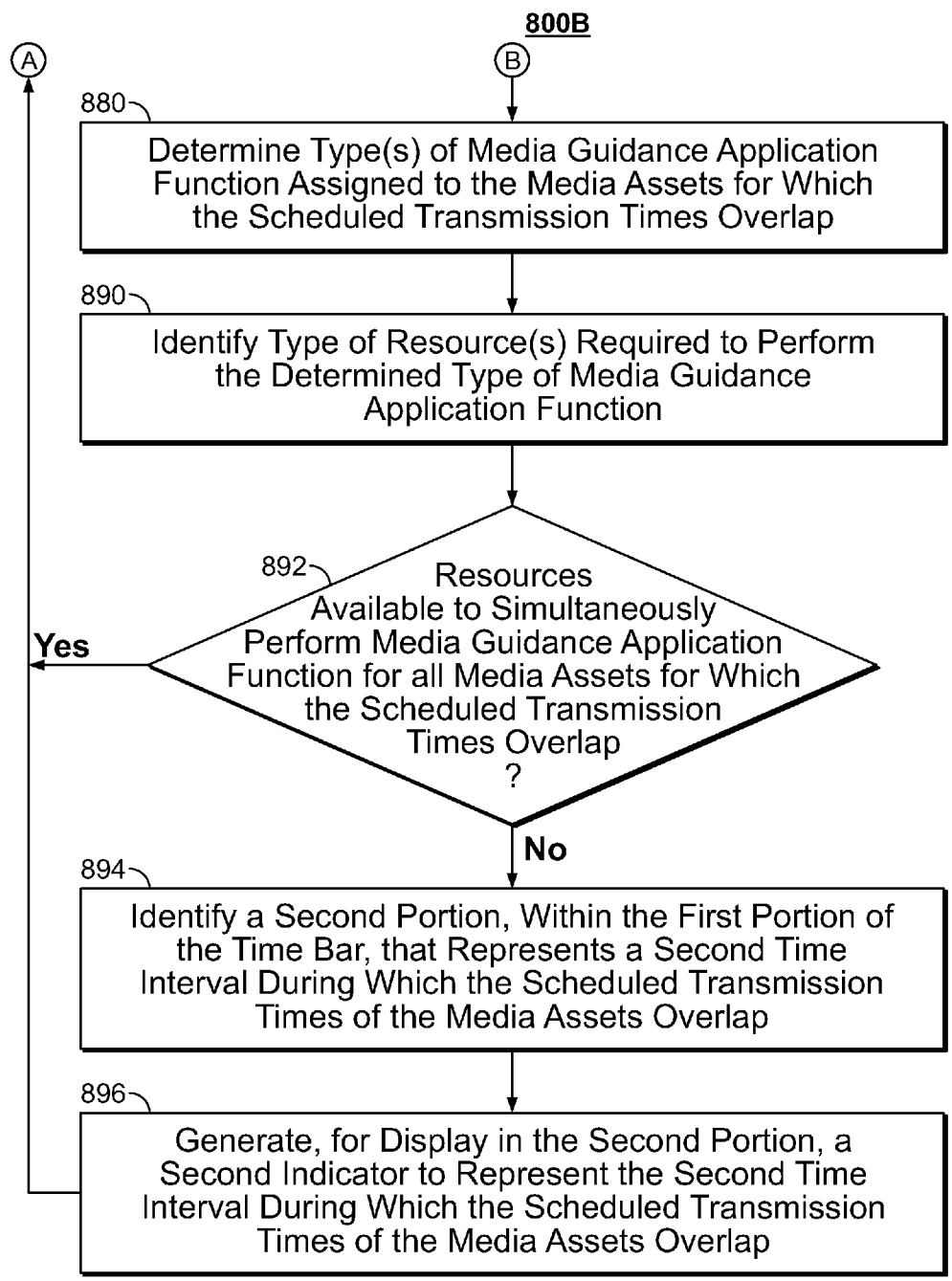

FIGS. 8A and 8B are diagrams 800A and 800B of a process for indicating media asset access conflicts using a time bar in accordance with embodiments of the invention. Specifically, diagrams 800A and 800B illustrate a process that the media guidance application may instruct control circuitry 304 to perform.

At step 810, a media guide display that includes a group of (or at least some of) a plurality of media asset listings and a time bar is generated. The group in the display may include all or only some of the total number of media asset listings. For example, control circuitry 304 may generate and display the media guide display shown in screen 500 that includes time bar 520 and region 510 (FIG. 5)

At step 820, a determination is made as to whether a media guidance application function is assigned to media assets. In response to determining there is a media guidance application function assigned to media assets, the process proceeds to step 830; otherwise the process proceeds to step 850. For example, control circuitry 304 may retrieve from storage 308 a list of all scheduled recordings, scheduled reminders and/or recommendations of media assets.

At step 850, the media guide screen is displayed.

At step 830, scheduled transmission times of the media assets for which the media guidance application functions has been assigned are retrieved from storage. For example, control circuitry 304 may retrieve from a schedule memory, the scheduled transmission times (e.g., broadcast times) for the media assets that have been scheduled for recording, scheduled for reminder or recommended.

At step 840, a first portion of the time bar that represents a first time interval during which the media assets are scheduled for transmission is identified. For example, control circuitry 304 may identify a portion of time bar 520 that represents transmission times of the media assets scheduled for transmission. In particular, control circuitry 304 may filter the list of media assets for which the function has been assigned to those media assets that have scheduled transmission times that are represented by time bar 520 (e.g., only the media assets scheduled for transmission on Tuesday and not Monday if the time bar corresponds to Tuesday time intervals).

At step 860, a first indicator is generated for display in the first portion. The first indicator represents the first time interval during which the media assets, to which the media guidance function has been assigned, are scheduled for transmission. For example, control circuitry 304 may display first indicator 522 (e.g., a bar highlighting the time interval portion of time bar 520 in a first color).

At step 870, a determination is made as to whether the scheduled transmission times overlap. In response to determining that the scheduled transmission times overlap (for at least two of the media assets), the process proceeds to step 880; otherwise the process proceeds to step 850. For example, control circuitry 304 compares the scheduled transmission times of the media assets to which the media guidance application function is assigned to determine whether any portion of their scheduled transmission times overlap. In particular, control circuitry 304 may determine whether any of the media assets that have been assigned the media guidance function are scheduled for transmission at the same time.

At step 880, the type(s) of media guidance application function assigned to the media assets for which the scheduled transmission times overlap is/are determined. For example, control circuitry 304 may determine whether the media guidance application function assigned to the media assets is a scheduled recording, scheduled reminder and/or a recommendation.

At step 890, the type of resource(s) required to perform or execute the determined type of media guidance application function is identified. For example, control circuitry 304 may determine whether a tuner/receiver and/or a storage device is/are required to perform the assigned media guidance application function.

At step 892, a determination is made as to whether sufficient resources are available to simultaneously perform media guidance application functions for all media assets for which the scheduled transmission times overlap. In response to determining there are sufficient resources, the process proceeds to step 850, otherwise the process proceeds to step 894. For example, when two or more media assets are scheduled for recording, control circuitry 304 may determine whether at least two storage devices and/or at least two tuners/receivers are simultaneously available during the overlap time period in the scheduled transmission times.

At step 894, a second portion within the first portion of the time bar is identified. The second portion represents a second time interval during which the scheduled transmission times of the media assets overlap. For example, control circuitry 304 may identify a portion of time bar 520 that represents an overlap in scheduled transmission times of the media assets.

At step 896, a second indicator is generated for display in the second portion to represent the second time interval during which the scheduled transmission times of the media assets overlap. For example, control circuitry 304 may display second indicator 524 (e.g., a bar highlighting the time interval portion of time bar 520 in a second color).

It should be understood that the above steps of the flow diagrams of FIGS. 8A and 8B may be executed or performed in any order or sequence not limited to the order and sequence shown and described in the figures. Also, some of the above steps of the flow diagrams of FIGS. 8A and 8B may be executed or performed substantially simultaneously where appropriate or in parallel to reduce latency and processing times. Also, some of the above steps of the flow diagrams of FIGS. 8A and 8B may be omitted or skipped.

The above described embodiments of the present disclosure are presented for purposes of illustration and not of limitation, and the present disclosure is limited only by the claims which follow.

What is claimed is:

1. A method for identifying media asset access conflicts with a user equipment device, the method comprising:
    generating a media guide display that includes at least some of a plurality of media asset listings and a time bar, wherein at least a portion of the time bar represents a time interval different from a time interval of the at least some of the plurality of media asset listings;
    identifying, using processing circuitry, a first portion of the time bar that represents a first time interval during which media assets, for which a respective media guidance function has been assigned, are scheduled for transmission;
    identifying, using the processing circuitry, a second portion, within the first portion of the time bar, that represents a second time interval during which the scheduled transmission times of the media assets, for which the respective media guidance function has been assigned, overlap; and
    generating for simultaneous display within the media guide display:
        a first indicator, in the first portion of the time bar, to represent the first time interval during which the media assets, to which the media guidance function has been assigned, are scheduled for transmission, wherein the first indicator is displayed regardless of whether the transmission times of the media assets overlap; and
        a second indicator, in the second portion of the time bar, to represent the second time interval during which the scheduled transmission times of the media assets overlap, wherein at least a part of the first or the second indicator corresponds to a first scheduled transmission time of one of the media assets that is different than a second scheduled transmission time, corresponding to a given media asset listing, represented in the media guide display.

2. The method of claim 1, wherein the media guidance function assigned to a first of the media assets includes a scheduled recording, a reminder for the first media asset, or a recommendation to a user to access the first media asset.

3. The method of claim 1 further comprising:
    determining whether the media guidance function assigned to the media assets having the scheduled transmission times that overlap causes a resource conflict; and
    preventing the second indicator from being displayed in response to determining that the media guidance function does not cause the resource conflict.

4. The method of claim 1, wherein the media guidance function assigned to a first of the media assets is different from the media guidance function assigned to a second of the media assets.

5. The method of claim 1, wherein the time bar represents a third time interval that includes the first and second time intervals, further comprising:
    receiving a user request to navigate through the plurality of media asset listings within the third time interval; and
    generating for display a first of the media asset listings corresponding to a first of the media assets after receiving the user request.

6. The method of claim 1, further comprising generating for display the time bar with the plurality of media asset listings, wherein the time bar in the generated display represents time intervals for a twelve or twenty-four hour period.

7. The method of claim 1, wherein the first and second indicators are generated for being displayed without a first media asset listing corresponding to a first of the media assets being displayed.

8. The method of claim 1, wherein the media guidance function assigned to a first and a second of the media assets is a recommendation to a user to access the first and second media assets, further comprising:
    scheduling the first media asset for recording; and
    generating for display the second media asset.

9. The method of claim 8, wherein the scheduling and the generating for display are performed automatically in response to receiving a first user selection of a first media asset listing that corresponds to the first media asset or a second user selection of a second media asset listing that corresponds to the second media asset.

10. The method of claim 1, further comprising:
    receiving a first user input selecting the second portion of the time bar;
    generating, for display, a prompt identifying the media assets for which the overlap in scheduled transmission times has been identified; and
    receiving a second user input changing the media guidance function assigned to one of the identified media assets.

11. A system for identifying media asset access conflicts with a user equipment device, the system comprising:
    control circuitry configured to:
        generate a media guide display that includes at least some of a plurality of media asset listings and a time bar, wherein at least a portion of the time bar represents a time interval different from a time interval of the at least some of the plurality of media asset listings;
        identify a first portion of the time bar that represents a first time interval during which media assets, for which a respective media guidance function has been assigned, are scheduled for transmission;
        identify a second portion, within the first portion of the time bar, that represents a second time interval during which the scheduled transmission times of the media assets, for which the respective media guidance function has been assigned, overlap; and
        generate, for simultaneous display within the media guide display:
            a first indicator, in the first portion of the time bar, to represent the first time interval during which the media assets, to which the media guidance function has been assigned, are scheduled for transmission, wherein the first indicator is displayed regardless of whether the transmission times of the media assets overlap; and
            a second indicator, in the second portion of the time bar, to represent the second time interval during which the scheduled transmission times of the media assets overlap, wherein at least a part of the first or the second indicator corresponds to a first scheduled transmission time of one of the media assets that is different than a second scheduled transmission time, corresponding to a given media asset listing, represented in the media guide display.

12. The system of claim 11, wherein the media guidance function assigned to a first of the media assets includes a scheduled recording, a reminder for the first media asset, or a recommendation to a user to access the first media asset.

13. The system of claim 11, wherein the control circuitry is further configured to:
- determine whether the media guidance function assigned to the media assets having the scheduled transmission times that overlap causes a resource conflict; and
- prevent the second indicator from being displayed in response to determining that the media guidance function does not cause the resource conflict.

14. The system of claim 11, wherein the media guidance function assigned to a first of the media assets is different from the media guidance function assigned to a second of the media assets.

15. The system of claim 11, wherein the time bar represents a third time interval that includes the first and second time intervals, and wherein the control circuitry is further configured to:
- receive a user request to navigate through the plurality of media asset listings within the third time interval; and
- generate for display a first of the media asset listings corresponding to a first of the media assets after receiving the user request.

16. The system of claim 11, wherein the control circuitry is further configured to generate for display the time bar with the plurality of media asset listings, wherein the time bar in the generated display represents time intervals for a twelve or twenty-four hour period.

17. The system of claim 11, wherein the first and second indicators are generated for being displayed without a first media asset listing corresponding to a first of the media assets being displayed.

18. The system of claim 11, wherein the media guidance function assigned to a first and a second of the media assets is a recommendation to a user to access the first and second media assets, and wherein the control circuitry is further configured to:
- schedule the first media asset for recording; and
- generate for display the second media asset.

19. The system of claim 18, wherein the scheduling and the generating for display are performed automatically in response to receiving a first user selection of a first media asset listing that corresponds to the first media asset or a second user selection of a second media asset listing that corresponds to the second media asset.

20. The system of claim 11, wherein the control circuitry is further configured to:
- receive a first user input selecting the second portion of the time bar;
- generate, for display, a prompt identifying the media assets for which the overlap in scheduled transmission times has been identified; and
- receive a second user input changing the media guidance function assigned to one of the identified media assets.

* * * * *